(12) United States Patent
Genma et al.

(10) Patent No.: US 7,536,829 B2
(45) Date of Patent: May 26, 2009

(54) MULTIPURPOSE PLANTING BASE

(75) Inventors: Sanji Genma, Saitama (JP); Satoru Furube, Saitama (JP)

(73) Assignee: Nippon Chiko Kabushiki Kaisha, Kawaguchi-Shi ( * ) Notice: Subject to any disclaimer, the term of this patent is extended or adjusted under 35 U.S.C. 154(b) by 489 days.

(21) Appl. No.: 10/580,681

(22) PCT Filed: Oct. 12, 2005

(86) PCT No.: PCT/JP2005/019162

§ 371 (c)(1),
(2), (4) Date: Jul. 11, 2006

(87) PCT Pub. No.: WO2007/043186

PCT Pub. Date: Apr. 19, 2007

(65) Prior Publication Data
US 2007/0079553 A1 Apr. 12, 2007

(51) Int. Cl.
*A01G 9/02* (2006.01)
(52) U.S. Cl. ............... 47/67; 47/83; 47/87; 47/66.5
(58) Field of Classification Search ............ 47/67, 47/83, 85, 87, 66.1, 66.5
See application file for complete search history.

(56) References Cited

U.S. PATENT DOCUMENTS 5,085,002 A * 2/1992 Lee et al. ............... 47/41.12
6,098,337 A * 8/2000 Chen et al. ............... 47/62 A

FOREIGN PATENT DOCUMENTS

| JP | 04088928 A | * | 3/1992 |
| JP | 07059467 A | * | 3/1995 |
| JP | 10257824 A | * | 9/1998 |
| JP | 2001169658 A | * | 6/2001 |
| JP | 2001320968 A | * | 11/2001 |
| JP | 2001327222 A | * | 11/2001 |
| JP | 2002-65060 | | 3/2002 |
| JP | 2002-281822 | | 10/2002 |
| JP | 2004-173649 | | 6/2004 |
| JP | 2004-248533 | | 9/2004 |
| JP | 2004254565 A | * | 9/2004 |
| JP | 2004337054 A | * | 12/2004 |
| JP | 2005065654 A | * | 3/2005 |

* cited by examiner

*Primary Examiner*—Son T. Nguyen
(74) *Attorney, Agent, or Firm*—Young & Thompson

(57) ABSTRACT

A multipurpose planting base includes a holding cover having an open window divided by a holding crosspiece, and a tray for supporting the opening side of the holding cover and for receiving a culture soil with which the holding cover is filled. When used for pot planting, it includes a planting pot tray having a planting pot exposed toward the open window when housed in the holding cover. When used for pot planting on a wall surface, in addition to the planting pot tray having the planting pot exposed toward the open window when housed in the holding cover, it also includes a pocket-type soil receiving tray attached to the outside of the planting pot of the planting pot tray for receiving culture soil in the planting pot, and a mesh board for holding the soil-receiving tray at a predetermined position and for holding down the holding cover.

1 Claim, 11 Drawing Sheets

(a)

(b)

(a)

(b)

(c)

(d)

(a)

(b)

(a)

(b)

(a)

(b)

(c)

MULTIPURPOSE PLANTING BASE

TECHNICAL FIELD

The present invention relates to a multipurpose planting base that can be installed on a concrete surface on a roof or the like, a slope, a folded-plate roof, or even on a wall surface or the like, and that enables turf planting, pot planting, and pot planting for wall surfaces.

BACKGROUND ART

In recent years, greening of building roofs, decks, and the like has been actively promoted. As a conventional technology regarding such greening of building roofs, Patent Document 1 (JP Patent Publication (Kokai) No. 2002-320408 A), as shown in FIG. 12(a), discloses a method for cultivation by installing a turf sheet 34 on the surface of a plant cultivation structure 31 provided with water retentivity using a porous material such as zeolite, so that plant roots can become settled in the gaps in the porous materials.

FIG. 12(b) shows a cross-sectional view of the plant cultivation structure 31 and a base 32 located thereunder of Patent Document 1 (JP Patent Publication (Kokai) No. 2002-320408 A). The base 32 is formed of a plastic or metal container capable of storing water, having a side surface 32a on the four sides. The base 32 is integrally fixed on the backside of the plant cultivation structure 31 by injecting zeolite as a porous material onto the upper portion of the base 32 and molding it at high pressure.

In an example shown in FIG. 12(c), a plurality of concave portions 33 are formed on the top surface (upper surface) of the plant cultivation structure 31 of Patent Document 1 (JP Patent Publication (Kokai) No. 2002-320408 A), such that plants can be cultivated by placing soil and seeds in individual concave portions 33.

Because the plant cultivation structure of the foregoing Patent Document 1 (JP Patent Publication (Kokai) No. 2002-320408 A) has plants take root in a porous material such as zeolite, only certain plants such as turf can be cultivated and flowering grasses, trees, or the like cannot be cultivated.

When a turf sheet is provided on the surface of the plant cultivation structure, there is no means for fixing the turf sheet. In order to prevent the turf sheet from being blown away by the wind or the like, a number of installed turf sheets may be entirely covered with a net or fixed with pins. However, such method involves very cumbersome construction.

When cultivating plants on a wall surface in pot planting, the soil in the pot may spill over when the pot is inclined sideways.

The invention has been made in consideration of such problems, and it is an object of the invention to provide a multipurpose planting base that can be easily installed on a concrete floor on a roof or the like, a slope, a folded-plate roof, or even on a wall surface or the like, and that enables turf planting, pot planting, and even pot planting on wall surfaces, without employing the conventional antiscattering net.

DISCLOSURE OF THE INVENTION

In order to achieve the above object, the multipurpose planting base of the invention includes a holding cover having an open window divided by a holding crosspiece, and a tray for supporting the opening side of the holding cover and for receiving culture soil with which the holding cover is filled. The holding cover has a planar rectangular or square shape with screw holes formed in the four corners thereof. The holding cover has a side portion having a height, and the side portion has a plurality of slits for vent openings and concave portions. The inside of the holding cover is filled with culture soil with the open windows of the holding cover, which are divided by the lattice-shaped holding crosspiece on the top surface of the holding cover, turned downward and blocked with the turf sheet turned upside down. The tray has a vertically extending frame at its periphery, the vertically extending frame having a planar shape and an internal diameter such that it fits on the outer periphery of the holding cover. A hook portion is formed on the inside of the vertically extending frame that fits in the concave portion of the holding cover. The holding cover is turned right side up with the opening side thereof covered with the tray, so that the turf sheet on the culture soil in the holding cover can be held down by the holding crosspiece of the holding cover.

The invention also provides a multipurpose planting base which includes a holding cover having an open window divided by a holding crosspiece, and a tray for supporting the opening side of the holding cover and for receiving culture soil with which the holding cover is filled. The base further includes a planting pot tray provided with a planting pot exposed toward the open window when housed in the holding cover. The holding cover is filled with culture soil with the open windows of the holding cover turned downward and blocked with the planting pot tray turned upside down. The holding cover side is then turned right side up with the opening side of the holding cover covered with the tray, so that the planting pot tray on the culture soil in the holding cover can be held down with the holding crosspiece of the holding cover. Then, plants can be cultivated in the planting pot exposed through the open windows of the holding cover.

The invention also provides a multipurpose planting base which includes a holding cover having an open window divided by a holding crosspiece, and a tray for supporting the opening side of the holding cover and for receiving culture soil with which the holding cover is filled. The base further includes a planting pot tray provided with a planting pot exposed through the open window when housed in the holding cover, a pocket-type soil-receiving tray attached to the outside of the planting pot of the planting pot tray for receiving culture soil in the planting pot, and a mesh board for holding the soil-receiving tray at a predetermined position and for holding down the holding cover. The base can be attached to a wall surface directly or via a clasp fixed on the wall surface with the use of a screw that penetrates the mesh board, the holding cover, and the tray.

The multipurpose planting base of the invention, when vertically installed on the wall surface, includes a temperature-sensitive water absorption/drainage mat comprised of a temperature-sensitive water absorption/drainage polymer disposed with an inclination along the lower peripheries of the individual planting pots provided in the planting pot tray of the planting base. Also, the invention includes another temperature-sensitive water absorption/drainage mat disposed with an inclination in the uppermost portion of the planting pot tray, and a watering pipe having a horizontal pipe with a plurality of water supply holes at a position where it comes into contact with the temperature-sensitive water absorption/drainage mat in the uppermost portion. The water that flows out of individual water supply holes is caused to be absorbed by the temperature-sensitive water absorption/drainage mat in the uppermost portion, and the water that flows down along the inclination of the temperature-sensitive water absorption/drainage mat in the uppermost portion is sequentially supplied to individual temperature-sensitive water absorption/drainage mats through lower temperature-sensitive water absorption/drainage mats and culture soil.

According to the multipurpose planting base of the invention, turf planting can be carried out with the use of the holding cover and the tray. The invention can be used for pot planting when the planting pot tray is provided in addition to the combination. Furthermore, other than the above combinations, the invention can be applied to pot planting on wall surfaces by providing the planting pot tray, the soil-receiving tray, and the mesh board.

In the above-described invention, when the multipurpose planting base is used for turf planting, a turf sheet can be held down with the holding crosspiece of the holding cover, so that the sheet can be integrated with the base, thereby enabling turf greening simply by installing it on the roof or the like. Also, since the turf sheet is held down with the holding crosspiece of the holding cover, it will not be blown away by the wind or the like. Such multipurpose planting base can be easily constructed on the work site, and does not need a conventional antiscattering net or a fixture for holding down the turf sheet, thereby considerably reducing labor at the work site.

When the multipurpose planting base of the invention is used for pot planting, because the base has a thickness, the base can be filled with culture soil, allowing various plants to be cultivated on a roof or the like. Therefore, the invention is effective in landscaping a rooftop or the like, or providing it with a certain design. By planting seeds or seedlings in a planting pot in advance and nursing them, such pot can be sold as a planting base in which plants have been planted. The purchaser can achieve roof greening simply by installing the base on a roof, a deck, or the like.

Furthermore, when the multipurpose planting base of the invention is used for pot planting on wall surfaces, by providing the soil-receiving tray and the mesh board in addition to the combination of the above-described members, the invention can be used as a planting base on wall surfaces as well. Culture soil in the planting pot can be prevented from spilling over by the individual pockets of the soil-receiving tray, and the stem of a plant planted sideways can be grown upward as it is bent at the upper edges of the individual pockets.

The multipurpose planting base of the invention, whether for turf planting or pot planting, can be safely installed on uneven roofs such as a folded-plate roof with screws, wires, or the like, thereby enabling greening of this type of roof.

When the multipurpose planting base of the invention is used for pot planting on wall surfaces, the invention includes a temperature-sensitive water absorption/drainage mat comprised of a temperature-sensitive water absorption/drainage polymer disposed with an inclination along the lower peripheries of the individual, planting pots provided in the planting pot tray. In addition, another temperature-sensitive water absorption/drainage mat is disposed with an inclination in the uppermost portion of the planting pot tray, and a watering pipe is provided that has a horizontal pipe with a plurality of water supply holes and that is disposed at a position where it comes into contact with the temperature-sensitive water absorption/drainage mat in the uppermost portion. The water that flows out of individual water supply holes is cause to be absorbed by the temperature-sensitive water absorption/drainage mat in the uppermost portion, and water that flows down along the inclination of the temperature-sensitive water absorption/drainage mat in the uppermost portion is sequentially supplied to lower temperature-sensitive water absorption/drainage mats through surrounding culture soil. Therefore, water can be evenly supplied to the surrounding areas of the individual planting pots.

The above-described temperature-sensitive water absorption/drainage mat absorbs and retains water at low temperature, and discharges water at a predetermined temperature (between 15° C. and 60° C.). For example, water that has been absorbed and retained by the temperature-sensitive water absorption/drainage mat at low-temperature state at night or in the morning is discharged outward to be supplied to plants when the temperature rises to a predetermined degree during the day. Therefore, watering through the watering pipe can be minimized. Because water from the temperature-sensitive water absorption/drainage mat is supplied upon reaching a predetermined temperature in the absence of watering, the water shortage of plants cultivated in the multipurpose planting base of the invention can be resolved just by supplying water daily or every few days.

BRIEF DESCRIPTION OF THE DRAWINGS

FIG. 11(a) shows a partial elevation of the upper portion of the holding cover, and FIG. 11(b) shows a cross-sectional view of the multipurpose vegetation base according to the embodiment as attached to a wall surface.

Figure 1:
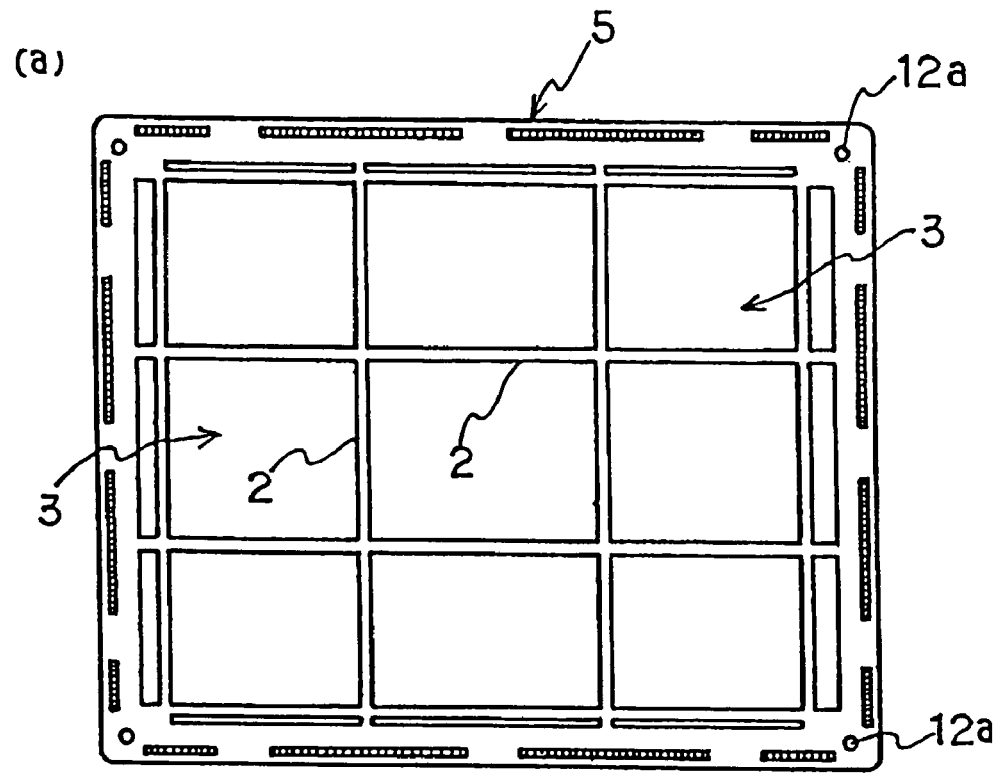
FIG. 1(a) shows a plan view of a holding cover of a first embodiment of the invention.
FIG. 1(b) shows a side view of the holding cover to which a tray is attached.
FIG. 1(c) shows an exploded cross-sectional view of the holding cover and the tray.
Figure 1:
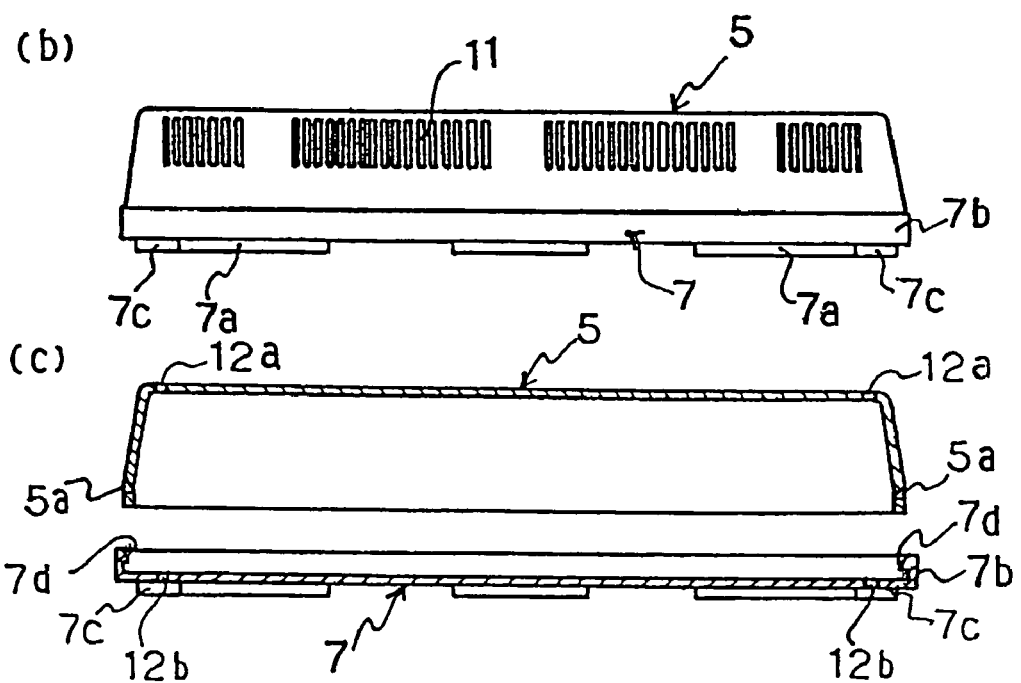

DRAWINGS 2 holding crosspiece
3 open window
4 plant 5 holding cover
5a concave portion
6 culture soil
7 tray
7a raised-bottom portion
7b vertically extending portion
7c cutout
7d hook portion
8 turf sheet
9 planting pot tray
9a flat plate portion
10 planting pot
11 slit
12a, 12b, 12c screw holes
13 long screw
15 soil-receiving tray
15a concave groove
15b protruding portion
15c flat plate portion
16 pocket
16a upper edge
17 opening window
18 dividing crosspiece
19 mesh board
20 wall surface
21 nut
22 nut
23 screw
24 clasp
24a screw hole
25 water supply hole
26 horizontal pipe
27 watering pipe
28 temperature-sensitive water absorption/drainage mat
28a temperature-sensitive water absorption/drainage mat in the uppermost portion
29 through-hole

BEST MODES FOR CARRYING OUT THE INVENTION

Hereafter, the embodiments of the invention will be explained with reference to the drawings.

First Embodiment

The multipurpose planting base of the embodiment, as shown in FIGS. 1(a) to (c), includes a holding cover 5 having an open window 3 divided by a holding crosspiece 2, and a tray 7 for supporting the opening side of the holding cover 5 and for receiving a culture soil 6 with which the holding cover 5 is filled. Such combination is adapted for use with planting a turf sheet 8. The above holding cover 5 or the tray 7 can be formed of synthetic resin or metal, for example.

To describe in greater details, the holding cover 5 is either rectangular or square in a plan view, and the holding cover has a height. A plurality of open windows 3 divided by the lattice-shaped holding crosspiece 2 are formed on the upper surface of the holding cover. The open windows 3 correspond to the position where a planting pot 10 provided in a planting pot tray 9 to be described later is formed. The holding crosspiece 2 is formed such that individual planting pots 10 are exposed through individual open windows 3.

A plurality of slits 11 for vent openings are formed in the side portion of the holding cover 5. Each slit 11 has a gap such that the culture soil 6 that fills the inside will not spill over, as will be described later.

Additionally, a screw hole 12a is formed in each of the four corners of the holding cover 5 for passing a long screw 13 to be described later therethrough. While the screw hole 12a is not necessary when the multipurpose planting base of the invention is used only for planting the turf sheet 8, providing it allows for pot planting in a second embodiment and for pot planting on wall surfaces in a third embodiment.

Meanwhile, the tray 7, as shown in FIG. 1(b), supports the opening side of the holding cover 5 and receives culture soil 6 with which the holding cover 5 is filled, and it has a planar shape and an internal diameter such that it fits on the outer periphery of the holding cover 5. Also, as shown in FIG. 1 (c), the tray 7 has a raised-bottom portion 7a on the bottom surface thereof, and a vertically extending frame 7b of the periphery can fit on the outer periphery of the opening side of the holding cover 5. Namely, a hook portion 7d is formed on the inside of the vertically extending frame 7b of the tray 7, and correspondingly, a concave portion 5a is formed on the side portion of the holding cover 5. When the tray 7 is fitted on the opening side of the holding cover 5, the hook portion 7d of the tray 7 and the concave portion 5a of the holding cover 5 are fitted with each other, whereby the holding cover 5 and the tray 7 are integrally fixed.

In addition, a screw hole 12b (see FIG. 7) is formed in each of the four corners of the tray 7 for passing a long screw 13 to be described later therethrough. While the screw hole 12b of the tray 7 is not necessary when the multipurpose planting base is used only for planting the turf sheet 8, as in the case of the screw hole 12a in the holding cover 5, providing the screw hole 12b in advance enables pot planting in the second embodiment and for pot planting on wall surfaces in the third embodiment.

Figure 2:
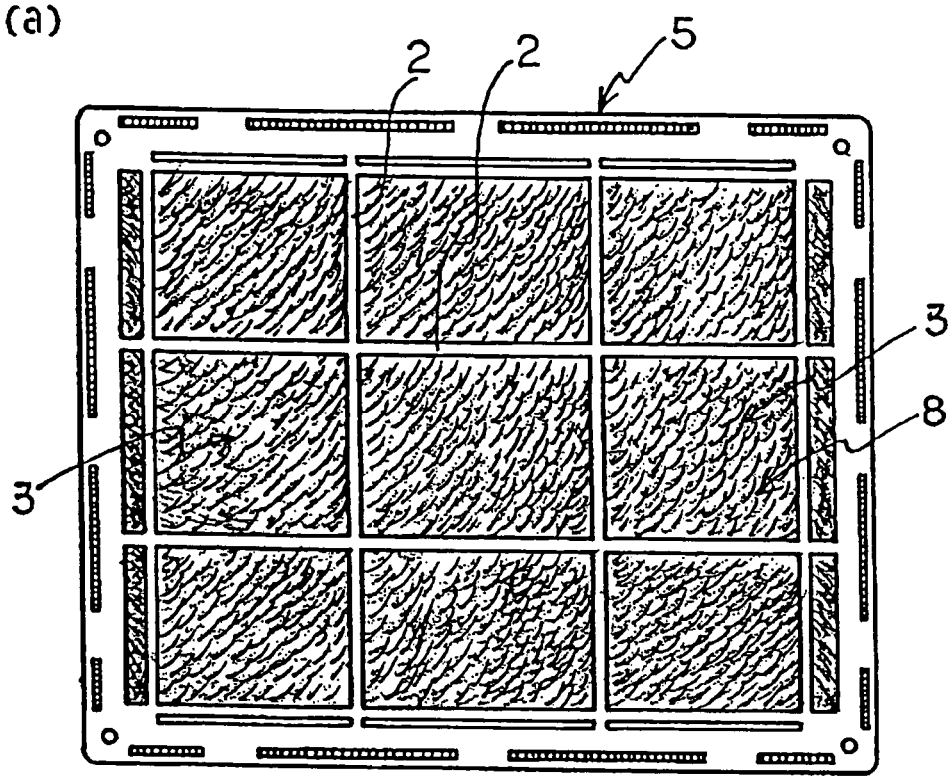
FIG. 2(a) shows a plan view of the multipurpose planting base with which a turf sheet is provided according to the first embodiment of the invention.
FIG. 2(b) shows its side view.
Figure 2:
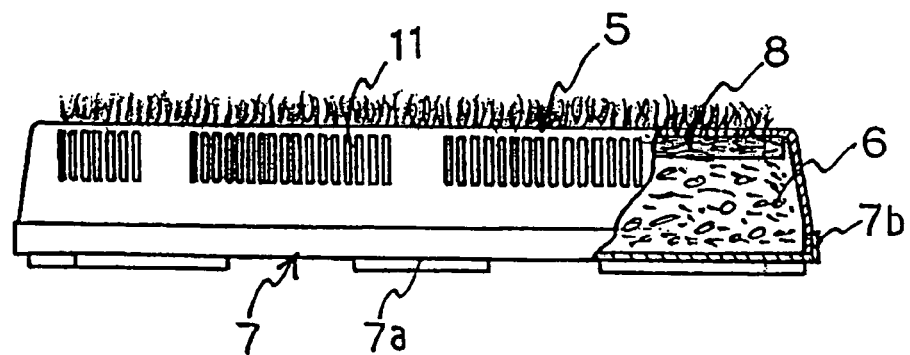
Figure 3:
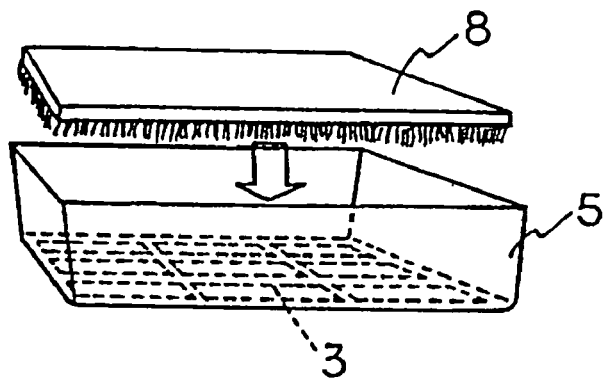
FIGS. 3(a) to (d) schematically show how the multipurpose planting base according to the first embodiment of the invention is assembled.
Figure 3:
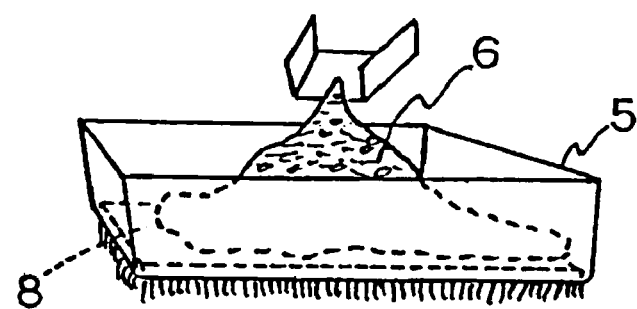
Figure 3:
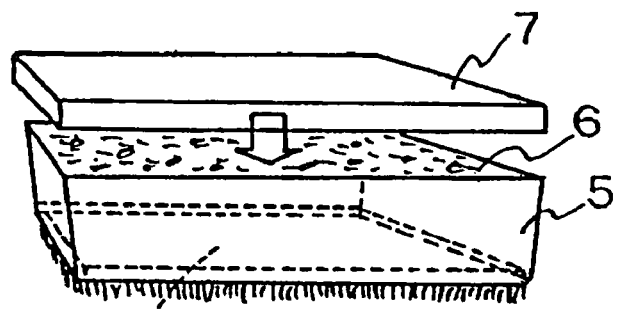
Figure 3:
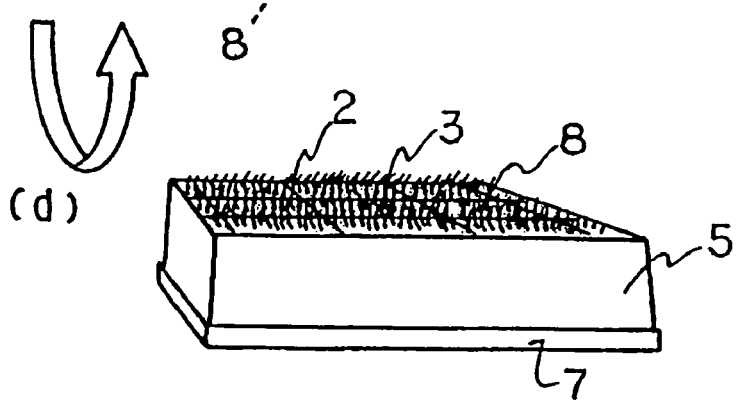

In order to plant the turf sheet 8 as shown in FIGS. 2(a) and (b), with the use of such holding cover 5 and tray 7, as shown in FIG. 3(a), the open windows 3 of the holding cover 5 are turned downward, and the turf sheet 8 turned upside down is housed therein. In this case, the area of the turf sheet 8 entirely covers the side of the open windows 3 of the holding cover 5. In this way, as shown in FIG. 3(b), the holding cover 5 can be filled with the culture soil 6 with the open windows 3 of the holding cover 5 blocked with the turf sheet 8. After that, as shown in FIG. 3(c), the opening side of the holding cover 5 is covered with the tray 7. At this point, the hook portion 7d (see FIG. 1(c)) of the vertically extending frame 7b of the tray 7 is fitted in the concave portion 5a of the holding cover 5, thereby integrally fixing the holding cover 5 and the tray 7.

Then, as shown in FIG. 3(d), the side of the open windows 3 of the holding cover 5 is turned right side up, and as shown in FIGS. 2(a) and (b), the turf sheet 8 on the culture soil 6 in the holding cover 5 is caused to be held down with the holding crosspiece 2 of the holding cover 5. Thus, the culture soil 6 is contained in the internal space between the tray 7 and the holding cover 5 and does not spill over. At the same time, the turf of the turf sheet 8 grows through the open windows 3 of the holding cover 5, while their roots can grow in the culture soil 6 and absorb nutrients and water therein.

Therefore, according to the multipurpose planting base of the embodiment, the turf sheet 8 housed in the upside-down holding cover 5 as described above becomes a soil receiver when the inside of the holding cover 5 is filled with the culture soil 6. After the opening side of the holding cover 5 is covered with the tray 7, the holding cover 5 is turned right side up, whereby the turf sheet 8 will be positioned on the upper portion of the culture soil 6 in the holding cover 5. Namely, the turf can be grown upward through the open windows 3 of the holding cover 5 with the turf sheet 8 held down with the holding cross piece 2 of the holding cover 5.

The multipurpose planting base that enables the planting of such turf sheet 8 can be installed on a flat surface of a roof, or even on a surface with some inclination. Furthermore, it can be fixed on a folded-plate roof with screws or the like for roof greening purposes.

With regard to the above culture soil 6, while the multipurpose planting base is filled with soil such as pumice stone, pumice stone alone cannot play the role of soil from the viewpoint of water retentivity, nutrient retentivity, or the like. Therefore, coir dust is mixed with bentonite, cocofiber, resin foam, fertilizer, or the like, and the mixture is compressed and formed in the shape of granules, briquettes, or pellets, or the like, having an external diameter such that they do not spill out of the slits. Fertilizer may be mixed when the pumice stone and the compressed solid matter are mixed, rather than being mixed in the compressed solid matter.

Second Embodiment

In the multipurpose planting base according to the present embodiment, the holding cover 5 and the tray 7 shown in FIGS. 1(a) to (c) are used for pot planting. In addition to the holding cover 5 and the tray 7 structured in the same way as in the first embodiment, the invention includes a planting pot tray 9 having a planting pot 10 exposed toward the open windows 3 of the holding cover 5 when housed in the holding cover 5. The planting pot tray 9 may also be formed of synthetic resin, metal, or the like, as in the case of the holding cover and the tray 7.

Figure 4:
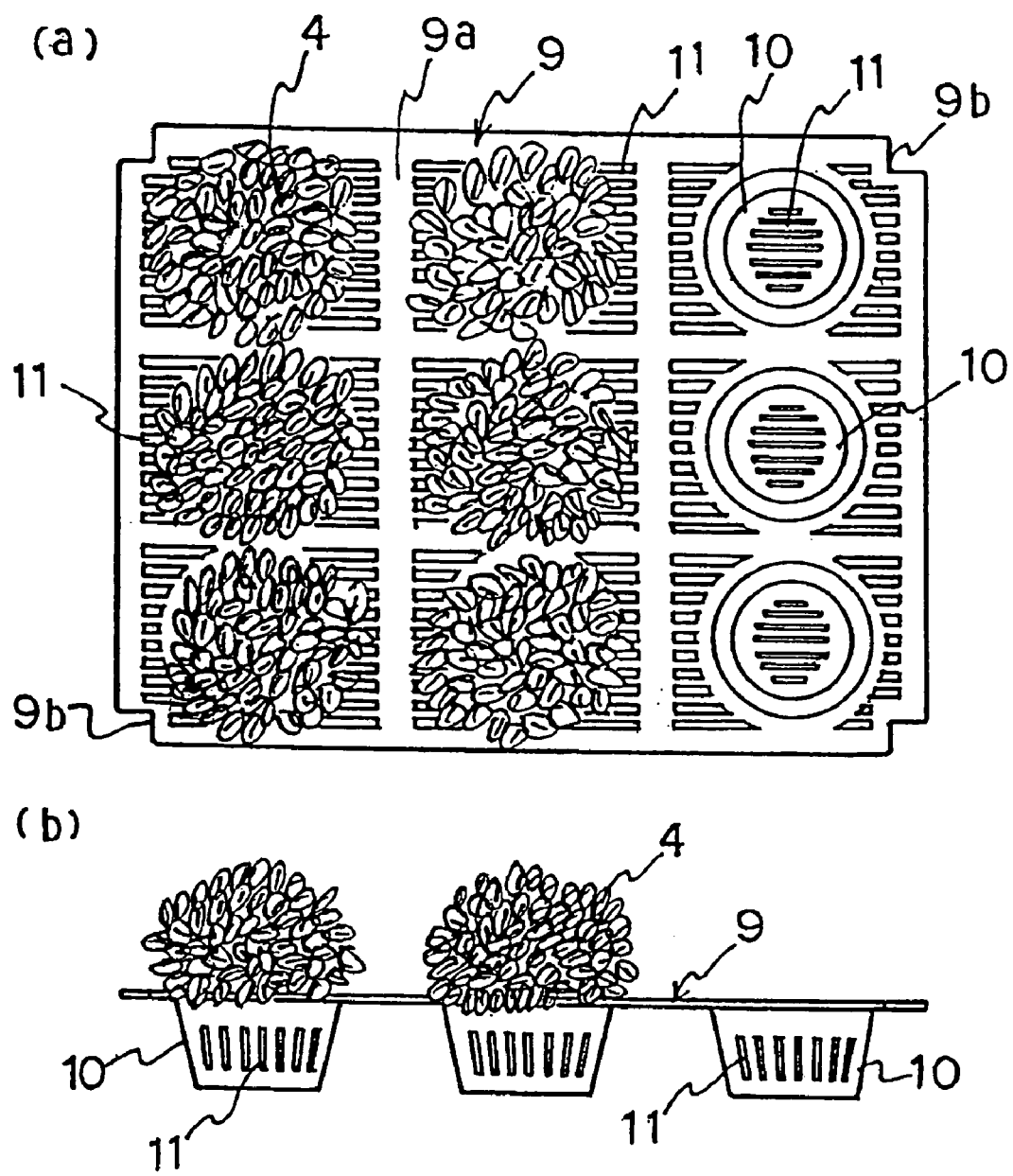
FIG. 4(a) shows a plan view of a planting pot tray used in a second embodiment of the invention.
FIG. 4(b) shows its side view.

Such structure will be described in greater detail. The planting pot tray 9 according to the present embodiment is structured such that the planting pots 10 are formed at positions where they are exposed through a plurality of open windows 3 divided by the holding crosspiece 2 of the holding cover 5 shown in FIG. 1(a). Thus, a plurality of the planting pots are formed as shown in FIG. 4(a). While slits 11 are not provided at positions where the holding cross piece 2 of the holding cover 5 is located, a plurality of slits 11 are provided as vent openings in the other flat plate portion 9a. Also, as shown in FIG. 4(b), the slits 11 are provided on the side portion of the planting pots 10 as well, thereby enabling ventilation and water flow and allowing for the passage and growth of roots.

Figure 5:
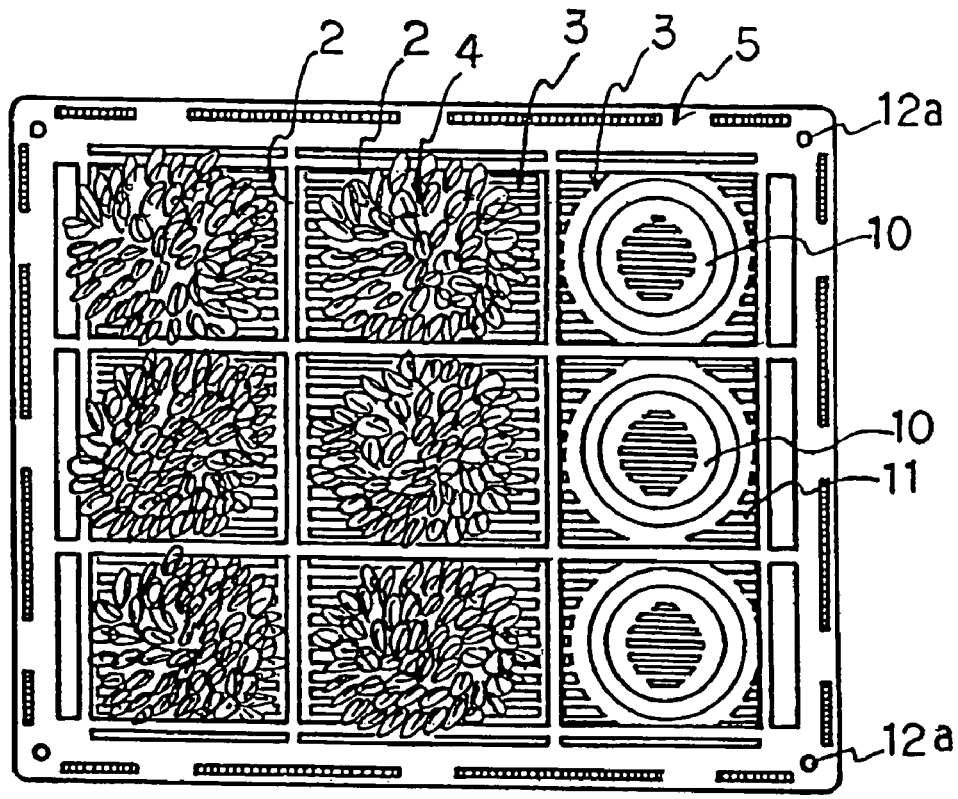
FIG. 5(a) shows a plan view of the planting pot of the multipurpose planting base according to the second embodiment of the invention in which plants are planted.
FIG. 5(b) shows its partial cross sectional side view.
Figure 5:
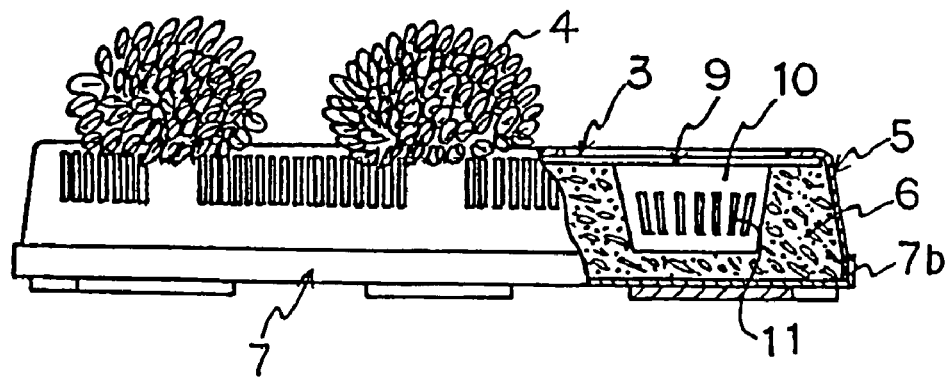

According to the above structure, as shown in FIGS. 5(a) and (b), the above planting pot tray 9 is housed between the holding cover 5 filled with the culture soil 6 and the tray 7, and a plant 4 having roots in each planting pot 10 can be cultivated. In such cultivation, the roots of the plant 4 can be grown into the culture soil 6 via the slits 11 of each planting pot 10.

While a root protection sheet is necessary for roof greening, no such root protection sheet is required by the invention, because the bottom surface of the tray 7 plays the role of a root protection sheet. Meanwhile, the water supplied from above reaches the bottom surface of the tray 7 via the culture soil 6, and it is discharged to the outside as it passes through the screw hole 12b provided in the tray 7. The water discharged to the outside of the tray 7, rain water, sprinkled water, and other excessive water can smoothly flow through the space at the bottom side of the tray 7 formed by a raised-bottom portion 7a of the tray 7.

For pot planting with the use of the holding cover 5, the tray 7, and the planting pot tray 9 as shown in FIGS. 5(a) and (b), the open windows 3 of the holding cover 5 are turned downward as shown in FIG. 6(a), and the planting pot tray 9 turned upside down is housed therein, so as to block the open windows 3 with the planting pot tray 9. As shown in FIG. 6(b), the inside of this holding cover 5 is filled with the same culture soil 6 as described in the first embodiment. Then, as shown in FIG. 6(c), the opening side of the holding cover 5 is covered with the tray 7. At this point, the hook portion 7d of the vertically extending frame 7b of the tray 7 shown in FIG. 1(c) is fitted in the concave portion 5a of the holding cover 5, thereby integrally fixing the holding cover 5 and the tray 7.

Then, as shown in FIG. 6(d), the side of the open windows 3 of the holding cover 5 is turned right side up, and the planting pot tray 9 on the upper portion of the culture soil 6 in the holding cover 5 is caused to be held down with the holding crosspiece 2 of the holding cover 5 as shown in FIGS. 5(a) and (b).

Therefore, according to the multipurpose planting base of the embodiment, the planting pot tray 9 housed in the upside-down holding cover 5 as described above becomes a soil receiver for the culture soil 6 with which the tray is filled. After the opening side of the holding cover 5 is covered with the tray 7, the holding cover 5 is turned right side up, whereby the planting pot tray 9 is positioned on the upper portion of the culture soil 6 in the holding cover 5, and the planting pot tray 9 is caused to be held down with the holding crosspiece 2 of the holding cover 5. Thus, the roots are planted in the individual planting pots 10 exposed through the open windows of the holding cover 5, thereby enabling the plants to grow upward.

Also, as in the case of the first embodiment, the multipurpose planting base that enables the above pot planting can be installed on a flat surface of a roof, or even on a surface with some inclination. Furthermore, it can be fixed on a folded-plate roof with screws, wires, or the like for roof greening purposes.

Third Embodiment

The multipurpose planting base of the present embodiment is used for pot planting in which the holding cover 5 and the tray 7 shown in FIGS. 1(a) to (c) are vertically attached along a wall surface. In addition to the holding cover 5 and the tray 7 structured as in the first embodiment, the base includes a planting pot tray 9 provided with a planting pot 10 exposed toward the open windows 3 of the holding cover 5 when housed in the holding cover 5. The base also includes a pocket-type soil-receiving tray 15 attached to the outside of the planting pot 10 of the planting pot tray 9 for receiving the culture soil 6 in the planting pot 10, and a mesh board 19 for holding the soil-receiving tray 15 at a predetermined position and for holding down the holding cover 5. The soil-receiving tray 15 and the mesh board 19 can also be formed of synthetic resin, metal, or the like, as in the case of the above planting pot tray 9, holding cover 5, and tray 7.

Such structure will be described in detail. The planting pot tray 9 of the embodiment, as in the case of the second embodiment and shown in FIG. 10, includes a planting pot 10 exposed toward the open windows 3 of the holding cover 5 when housed in the holding cover 5. Planting pots 10 are formed at positions where they are exposed through a plurality of open windows 3 divided by the holding crosspiece 2 of the holding cover 2, and a number of slits 11 are provided at required places.

Figure 7:
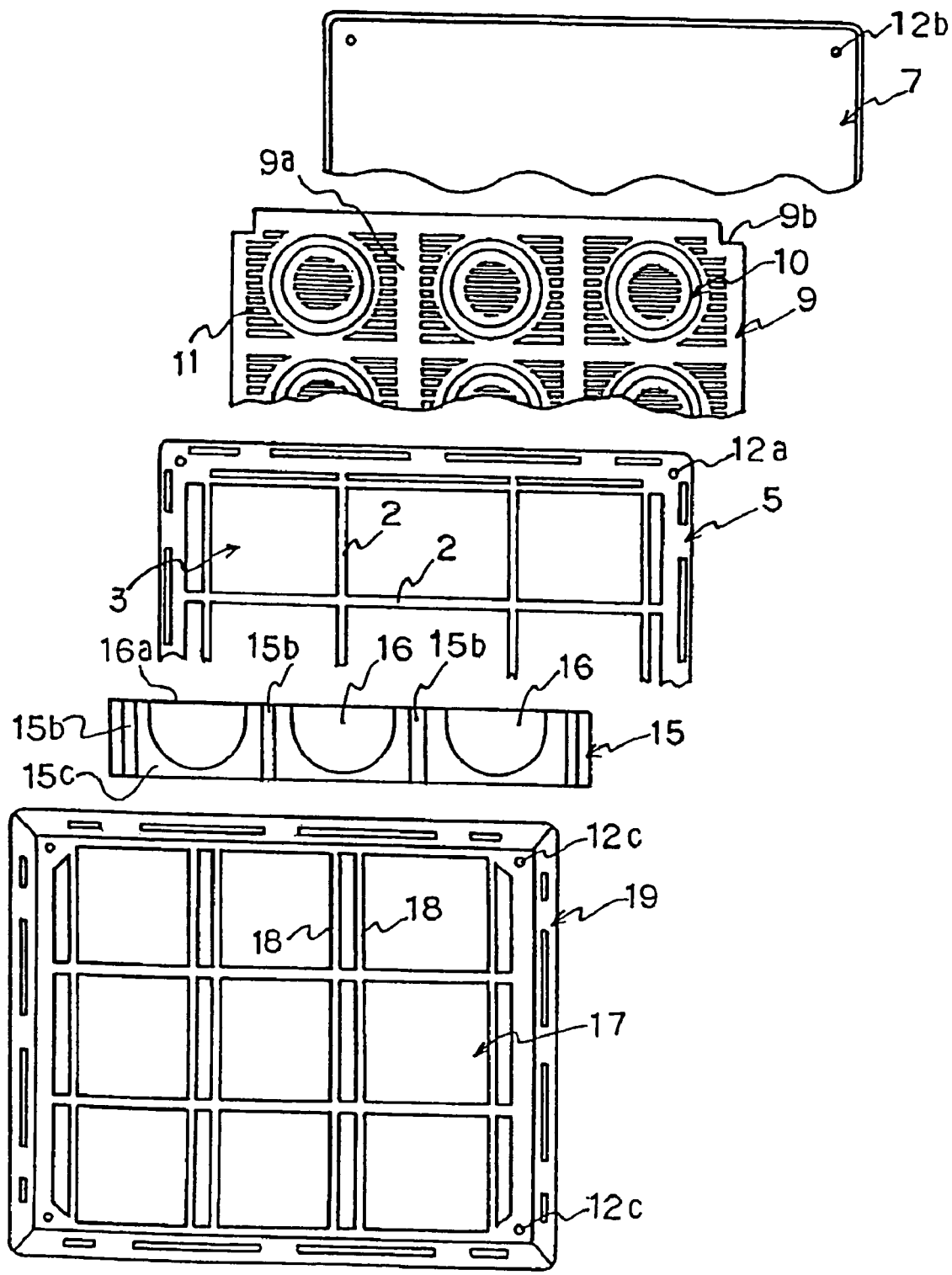
FIG. 7 shows an exploded plan view (a portion is shown for some members) of the multipurpose planting base according to a third embodiment of the invention.

As shown in FIG. 7, a cut-out concave portion 9b (see FIG. 4(a)) is formed at each of the four corners of the planting pot tray 9. The cut-out concave portions are disposed at positions where they correspond to screw holes 12a and 12b formed in the four corners of the holding cover 5 and the tray 7. As will be described later, this functions as relief for a long screw 13 (see FIG. 10) passing through the screw holes 12a and 12b of the holding cover 5 and the tray 7.

The soil-receiving tray 15 is attached to the outside of the planting pot 10 of the planting pot tray 9 and is adapted to receive the culture soil 6 in the planting pot 10. Namely, its shape corresponds to the number of the planting pots 10 in a row that are provided in the planting pot tray 9. As shown in FIG. 7, when three planting pots 10 are formed in a row of the planting pot tray 9, for example, three pockets 16 are provided in the soil-receiving tray 15.

Figure 9:
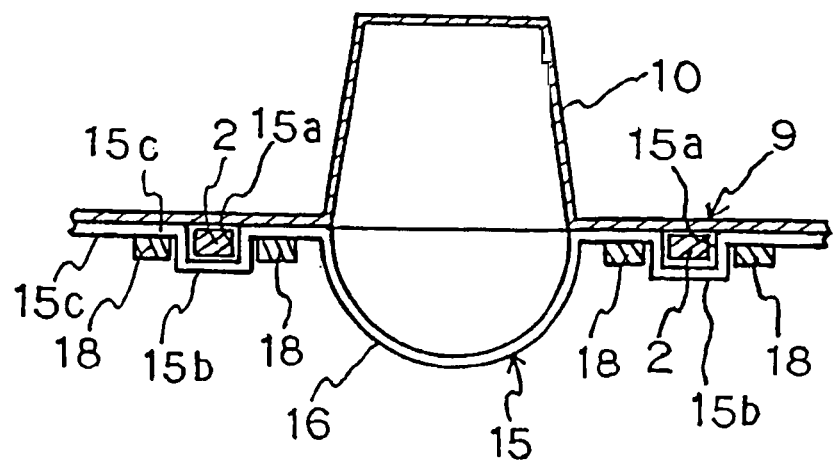
FIG. 9 shows a partial cross-sectional view of the multipurpose planting base according to the third embodiment of the invention.

Also, as shown in FIG. 9, because the soil-receiving tray 15 abuts against the upper side of the holding crosspiece 2 of the holding cover 5, a protruding portion 15b having a concave groove 15a is formed between individual pockets 16, and on both sides thereof as a relief for the holding crosspiece 2 (see FIG. 7), whereby a flat plate portion 15c of the soil-receiving tray 15 can be attached to the planting pot tray 9 such that they are joined together.

Figure 10:
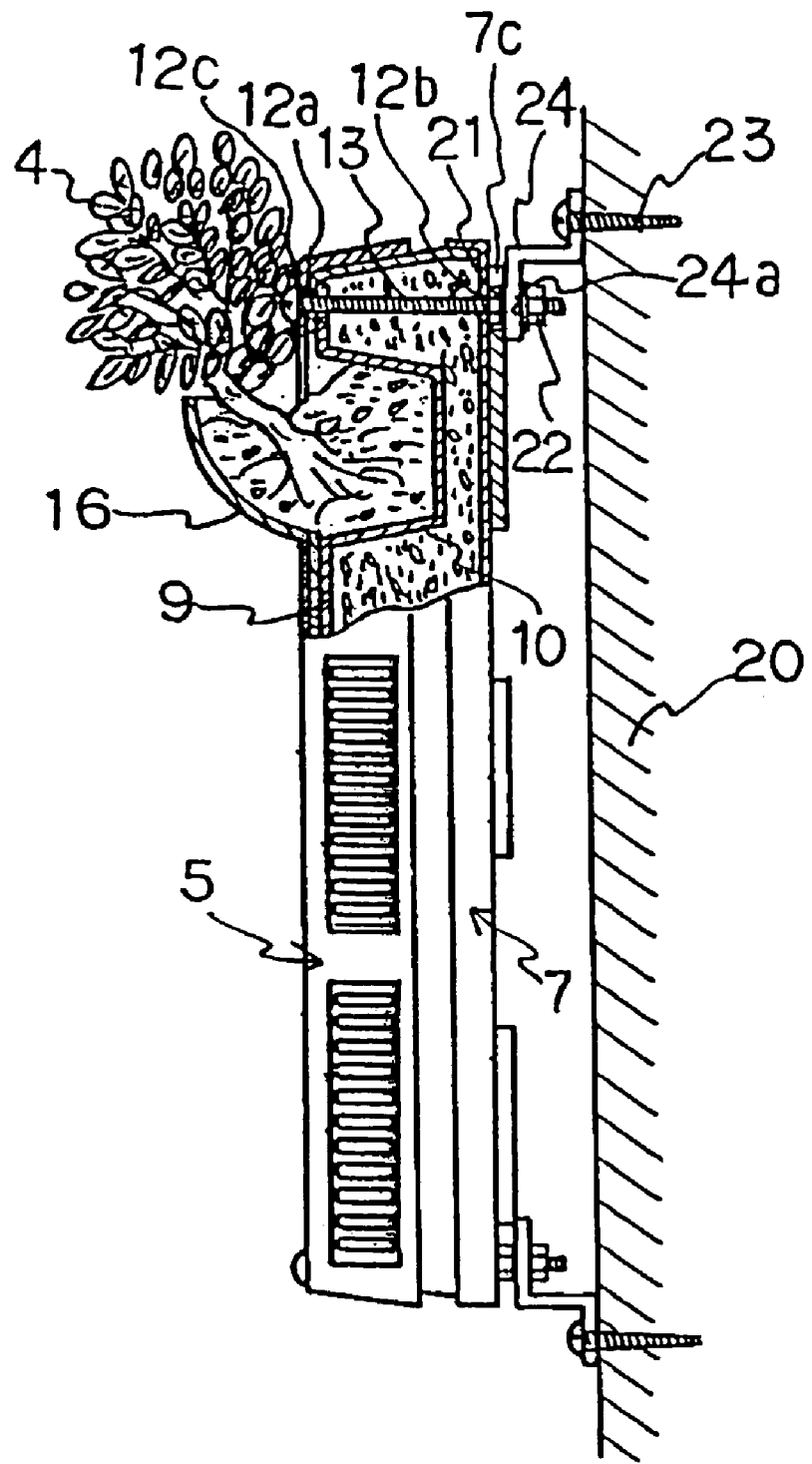
FIG. 10 shows a partial cross-sectional side view of the multipurpose planting base according to the third embodiment of the invention as attached to a wall surface.

Furthermore, by allowing each pocket 16 of the soil-receiving tray 15 to have a height that exceeds the diameter of the sphere of each planting pot 10 of the planting pot tray 9, as shown in FIG. 10, the culture soil 6 in each planting pot 10 can be received by the pocket 16. Also, the stem of the plant planted in each planting pot 10 can be raised by an upper edge 16a of the pocket 16, thereby enabling the stem to grow upward.

Figure 8:
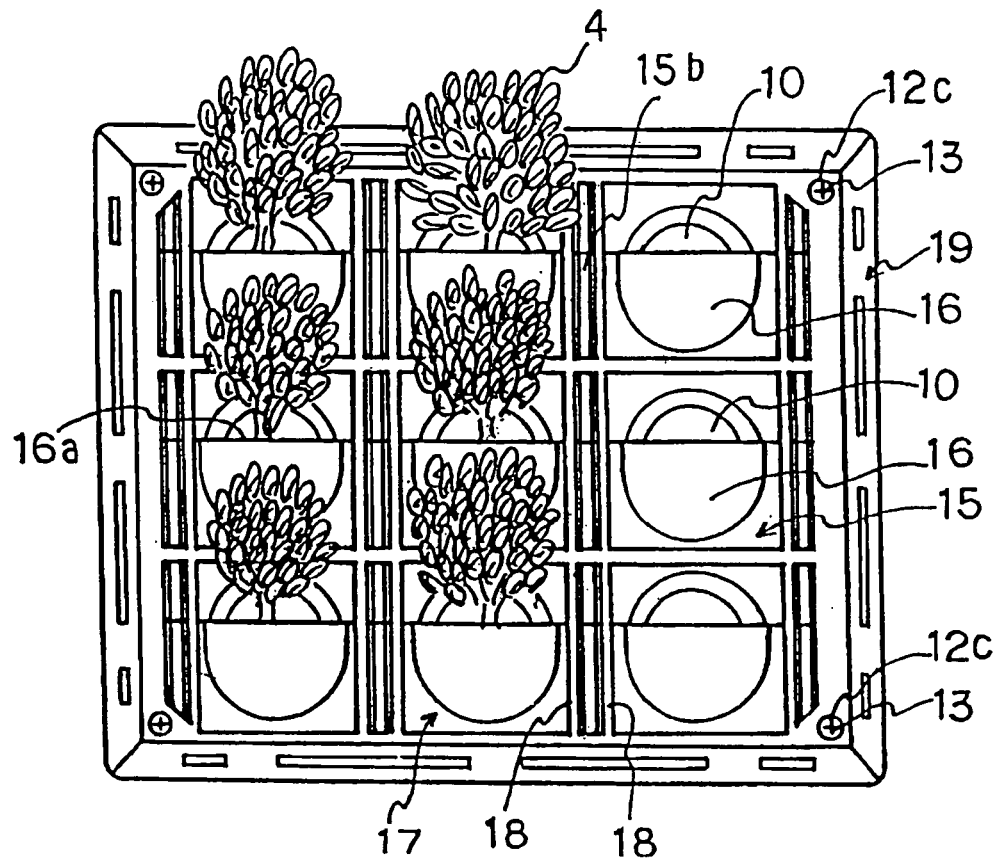
FIG. 8 shows an elevation view of the multipurpose planting base according to the third embodiment of the invention in which plants are planted.

The mesh board 19 holds the soil-receiving tray 15 at a predetermined position and holds down the holding cover 5. Namely, as shown in FIGS. 8 and 9, the mesh board 19 is formed in a shape such that it covers the holding cover 5 from above, and includes an opening window 17 (see FIG. 7) that approximately corresponds to the open windows 3 of the holding cover 5. A dividing crosspiece 18 that divides the opening window 17 employs two bars for pinning the flat plate portion 15c of the soil-receiving tray 15 from the side of each protruding portion 15b of the soil-receiving tray 15.

Furthermore, as shown in FIG. 7, a screw hole 12c is formed in each of the four corners of the mesh board 19. Individual screw holes 12c are formed at positions where their positions correspond to the screw holes 12a and 12b provided in the four corners of the holding cover 5 and the tray 7. As shown in FIG. 10, a long screw 13 that passes through the screw hole 12c in the mesh board 19 passes through the screw hole 12a in the holding cover 5 and the screw hole 12b in the tray 7. The long screw 13 is once fastened with a nut 21 at the cutout 7c formed at a corner of the raised-bottom portion 7a of the tray 7. Then, the extra length of the long screw 13 is passed through a screw hole 24a of a clasp 24 that is fixed on a wall surface 20 with a screw 23 or the like, and it is fixed with a nut 22.

Pot planting on the wall surface 20 as shown in FIG. 10 can be conducted, using the holding cover 5, tray 7, planting pot tray 9, soil-receiving tray 15, and mesh board 19, in the same way as in the case of the second embodiment. Namely, in a procedure shown in FIGS. 6(a) to (d), the inside of the holding cover 5 and the tray 7 in which the planting pot tray 9 is housed is filled with the culture soil 6, the holding cover 5 and the tray 7 are integrally fixed, and then, the soil-receiving tray 15 is attached to each row of the planting pot tray 9. Then, the mesh board 19 is covered from above, and the long screws 13 are inserted into the screw holes 12 in the four corners, so as to fix the assembly onto the clasp 24 on the wall surface 20 as described above.

The multipurpose planting base for pot planting on the wall surface 20 according to the present embodiment can be thus completed by fastening screws and employing the holding cover 5 and tray 7 of the first embodiment, the planting pot tray 9 of the second embodiment, and the soil-receiving tray 15 and mesh board 19, which are unique to the present embodiment.

In accordance with the multipurpose planting base of the embodiment, as described above, the pocket 16 of the soil-receiving tray 15 receives the culture soil 6 in each planting pot 10, thereby preventing the culture soil 6 in each planting pot 10 from spilling over. Furthermore, the stem of the plant 4 planted in each planting pot 10 is raised by the upper edge 16a of the pocket 16, thereby enabling the stem to grow upward.

Fourth Embodiment

The multipurpose planting base of the present embodiment is used for pot planting in which the holding cover 5 and the tray 7 are vertically attached on a wall surface 20, as in the case of the third embodiment. The multipurpose planting base includes a planting pot tray 9 provided with a planting pot 10 exposed toward the open windows 3 of the holding cover 5 when housed in the holding cover 5, a soil-receiving tray 15 having a pocket 16 attached to the outside of the planting pot tray 9 for receiving the culture soil 6 in the planting pot 10, and a mesh board 19 for holding the soil-receiving tray 15 at a predetermined position and for holding down the holding cover 5.

With regard to a water supply mechanism for the multipurpose planting base structured as described above, it is conceivable to provide a water retention mat along the bottom surface of the tray or a water-guiding mat having a water supply device, for example, both of which are not shown. However, if a planting base is vertically attached on a wall surface, the mat provided therein will be vertical as well. When water is supplied to such mat from above, the water content of the mat becomes small in the upper portion but large in the lower portion, resulting in the inconvenience that water cannot evenly be supplied to the planted plants disposed vertically. Furthermore, because the water supplied from above is discharged from the lower portion, water is wasted and loss of economy results.

In the present embodiment, even when the multipurpose planting base, which is provided with the soil-receiving tray 15 having a plurality of pockets 16 as in the third embodiment, is vertically attached to the wall surface 20, water is allowed to be evenly supplied to the peripheries of individual planting pots 10.

Figure 11:
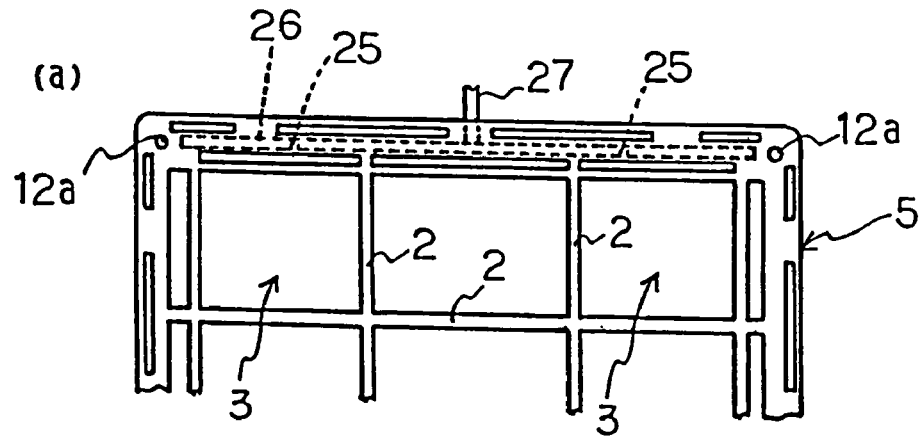
FIG. 11 is a drawing that relates to the multipurpose planting base according to a fourth embodiment of the invention.
Figure 11:
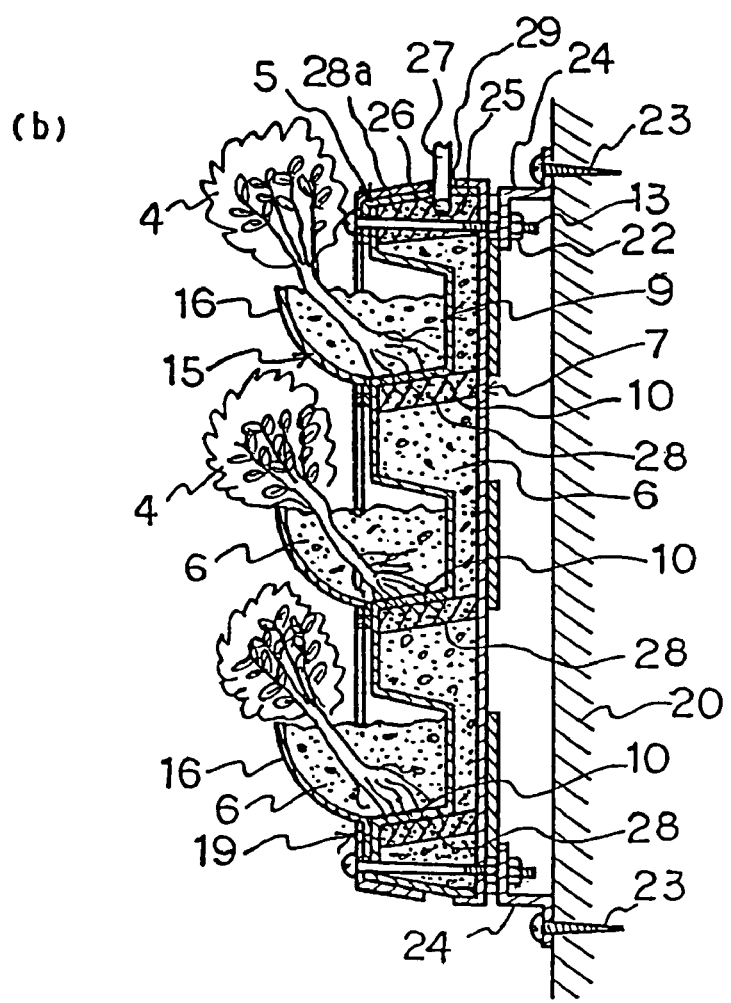
Figure 12:
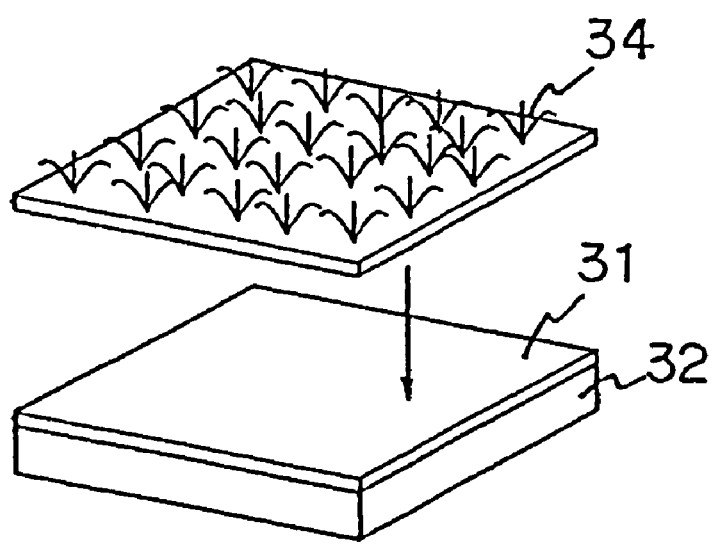
FIGS. 12(a) to (c) are diagrams for explaining Patent Document 1 (JP Patent Publication (Kokai) No. 2002-320408 A).
Figure 12:
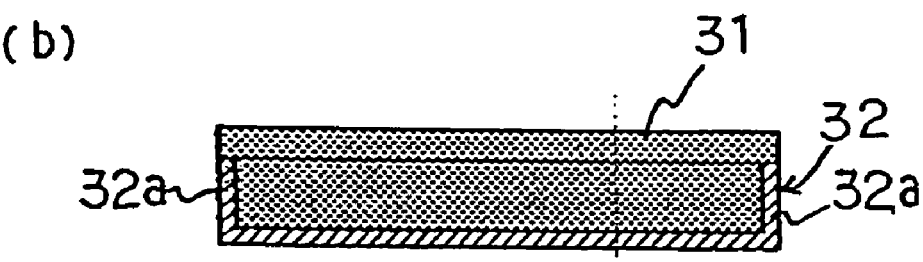
Figure 12:
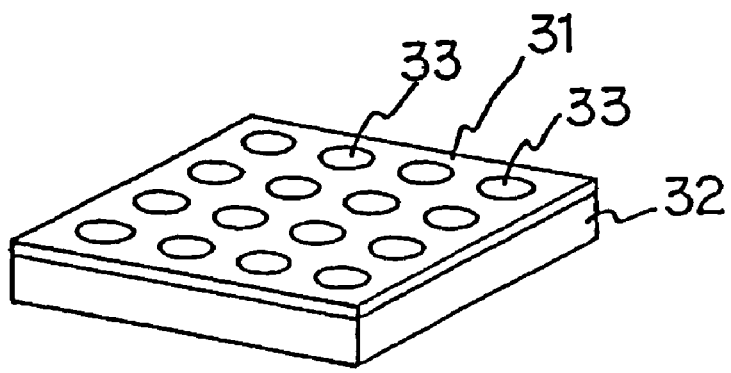

Namely, as shown in FIGS. 11(a) and (b), the structure includes a temperature-sensitive water absorption/drainage mat 28 disposed with an inclination along the lower peripheries of individual planting pots 10 provided in the planting pot tray 9 of the planting base vertically attached to a wall surface 20. The temperature-sensitive water absorption/drainage mat 28 is made of urethane or the like that contains a temperature-sensitive water absorption/drainage polymer for providing water retentivity and water discharge ability. The structure also includes another temperature-sensitive water absorption/drainage mat 28a disposed with an inclination in the uppermost portion of the planting pot tray 9, and a watering pipe 27 provided with a horizontal pipe 26 with a plurality of water supply holes 25 is provided at a position where it is in contact with the temperature-sensitive water absorption/drainage mat 28a in the uppermost portion.

Such structure will be described in detail. As shown in FIG. 11(b), a plurality of planting pots 10 vertically and horizontally disposed in the planting pot tray 9 are formed, and individual planting pots 10 are shaped such that they narrow toward the bottom surface of the tray 7. Therefore, when the planting pot tray 9 is installed vertically, by providing the temperature-sensitive water absorption/drainage mat 28 along the lower peripheries of individual planting pots 10, the individual temperature-sensitive water absorption/drainage mats 28 are caused to have the inclination (a downslope toward the opening sides of the individual planting pots 10) along the peripheries of the planting pots 10 having a narrowing shape.

The inclination required for the temperature-sensitive water absorption/drainage mat 28 has an angle more than zero degrees with respect to the horizontal direction, and preferably, the inclination has an angle between five to thirty degrees with respect to the horizontal direction, in order to facilitate the transfer of water retained in the temperature-sensitive water absorption/drainage mat 28 and water discharged from the temperature-sensitive water absorption/drainage polymer in the mat due to gravity, and also to facilitate the outflow from the lower end portion thereof.

In the present embodiment, a temperature-sensitive water absorption/drainage mat 28a is provided with an inclination in the uppermost portion of the planting pot tray 9. The temperature-sensitive water absorption/drainage mat 28a in the uppermost portion, as shown in FIG. 11(b), is provided along the inside of the holding cover 5 through the use of the inclination of the outer periphery of the holding cover 5, whereby the temperature-sensitive water absorption/drainage mat 28a in the uppermost portion is provided with an inclination as well. Preferably, this temperature-sensitive water absorption/drainage mat 28a in the uppermost portion is also installed with a downslope of five to thirty degrees, as in the case of the individual temperature-sensitive water absorption/drainage mats 28.

Figure 6:
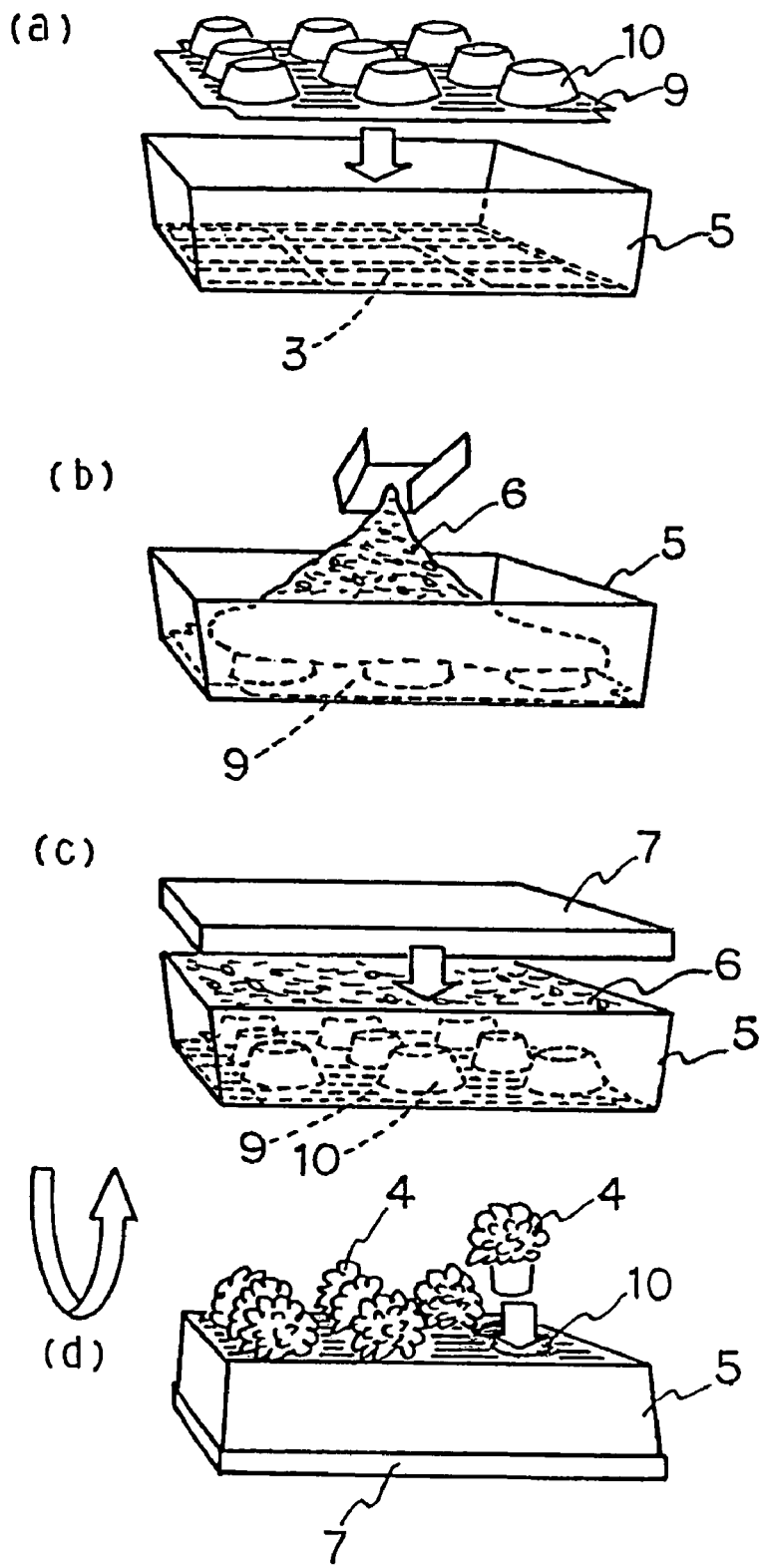
FIGS. 6(a) to (d) schematically show how the multipurpose planting base according to the second embodiment of the invention is assembled.

The individual temperature-sensitive water absorption/drainage mats 28 and the temperature-sensitive water absorption/drainage mat 28a in the uppermost portion may be installed when the inside of the holding cover 5 is filled with the culture soil 6, as shown in FIG. 6. Namely, as shown in FIG. 6(a), when the open windows 3 of the holding cover 5 are turned downward and the upside-down planting pot tray 9 is housed therein, each planting pot 10 is caused to be installed with the bottom portion turned upside down. At this time, the temperature-sensitive water absorption/drainage mats 28 (not shown in FIG. 6) are added along the portions that are to be the lower peripheries of individual planting pots 10 when the planting pot tray 9 is vertically disposed. Also, the temperature-sensitive water absorption/drainage mat 28a in the uppermost portion (not shown in FIG. 6) is added along the outer periphery of the holding cover 5. Then, the inside of the holding cover 5 is filled with the culture soil 6 as shown in FIG. 6(b), whereby the individual temperature-sensitive water absorption/drainage mats 28 and 28a are installed with an inclination at the lower peripheries of the individual planting pots 10 and in the uppermost portion of the planting pot tray 9.

Furthermore, the present embodiment, as shown in FIGS. 11(a) and (b), includes a watering pipe 27 provided with a horizontal pipe 26 with a plurality of water supply holes 25 at a position where it comes into contact with the temperature-sensitive water absorption/drainage mat 28a in the uppermost portion. In order to provide the watering pipe 27 in this way, it is necessary to provide a through-hole 29 through which the watering pipe 27 passes in the predetermined positions of the holding cover 5 and the mesh board 19. Also, individual watering pipes 27 are connected a collecting pipe not shown in a figure, so as to supply water from a water supply device.

In the above structure, both ends of the horizontal pipe 26 of the watering pipe 27 are blocked so that water is discharged out of a plurality of water supply holes 25 only and absorbed by the temperature-sensitive water absorption/drainage mat 28a in the uppermost portion in contact with the holes.

In accordance with the above structure, water that flows out of the individual water supply holes 25 provided in the horizontal pipe 26 of the watering pipe 27 is absorbed and retained by the temperature-sensitive water absorption/drainage mat 28a in the uppermost portion, and extra water that flows down from the lower end portion of the temperature-sensitive water absorption/drainage mat 28a in the uppermost portion along the inclination thereof flows to the periphery of a lower planting pot 10 via surrounding culture soil 6. Then, the water is absorbed and retained by the temperature-sensitive water absorption/drainage mat 28 provided below the planting pot 10. Thus, water is sequentially supplied to the individual temperature-sensitive water absorption/drainage mats 28 via lower temperature-sensitive water absorption/drainage mats 28 and the culture soil 6.

Because such temperature-sensitive water absorption/drainage mats 28 are provided along the lower sides of individual planting pots 10, it is possible for the roots of the plant 4 in each planting pot 16 to take root in the temperature-sensitive water absorption/drainage mat 28 through the slit 11 (see FIG. 5(b)) of the planting pot 10 and directly absorb water from this temperature-sensitive water absorption/drainage mat 28.

In the fourth embodiment, the temperature-sensitive water absorption/drainage mats 28 and 28a are water absorption/drainage mats in which a temperature-sensitive water absorption/drainage polymer is added to urethane. They have the property to absorb and retain water at low temperature and to discharge water at a predetermined high temperature (between 15° C. and 60° C.). Regarding such substance, as a urethane mat in which a temperature-sensitive water absorption/drainage resin "THERMO GEL" is mixed, "WATER BANK" (trade-name of KOHJIN CO., Ltd.) is publicly known.

If such a temperature-sensitive water absorption/drainage mat as described above is used, for example, water that has been absorbed and retained by the temperature-sensitive water absorption/drainage mat at low-temperature state at night or in the morning is discharged when the temperature increases to a predetermined degree during the day and it is supplied to the plant. For this reason, watering through the watering pipe can be minimized, and because water from the temperature-sensitive water absorption/drainage mat is supplied upon reaching a predetermined temperature in the absence of watering, it helps to resolve the water shortage of plants planted in the multipurpose planting base simply by supplying water daily or every few days. It is preferable to change the thickness of the temperature-sensitive water absorption/drainage mat or use the temperature-sensitive water absorption/drainage mat having a temperature-sensitive point suitable for the plant, depending on the plant planted in the multipurpose planting base.

INDUSTRIAL APPLICABILITY

The multipurpose planting base of the invention can be used for planting a turf sheet with the use of a holding cover and a tray, and it can also be used for pot planting when provided with a planting pot tray in addition to the combination. Furthermore, in addition to the above combinations, it can be used for pot planting attached on a wall surface when provided with a soil-receiving tray and a mesh board. Therefore, the multipurpose planting base of the invention can be used as a multipurpose planting base by appropriately combining the holding cover, the tray, the planting pot tray, the soil-receiving tray, and the mesh board.

The invention claimed is:

1. A multipurpose planting base comprising:
 a holding cover having an open window divided by a holding crosspiece;
 a tray for supporting the opening side of the holding cover and for receiving culture soil with which the holding cover is filled;
 a planting pot tray provided with a planting pot exposed through the open window when housed in the holding cover;
 a pocket-type soil-receiving tray attached to the outside of the planting pot of the planting pot tray for receiving culture soil in the planting pot; and
 a mesh board for holding the soil-receiving tray at a predetermined position and for holding down the holding cover,
 wherein the multipurpose planting base is attached directly on a wall surface or via a clasp fixed on the wall surface with a screw passing through the mesh board, the holding cover, and the tray.

* * * * *